Figure 1:
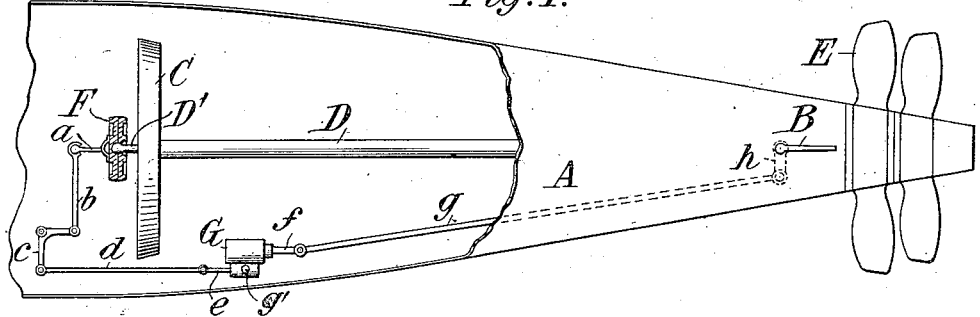

F. M. LEAVITT.
STEERING MECHANISM FOR TORPEDOES.
APPLICATION FILED AUG. 14, 1915.

1,179,439.

Patented Apr. 18, 1916.
2 SHEETS—SHEET 1.

WITNESSES:

INVENTOR
Frank M. Leavitt,
By Attorneys,

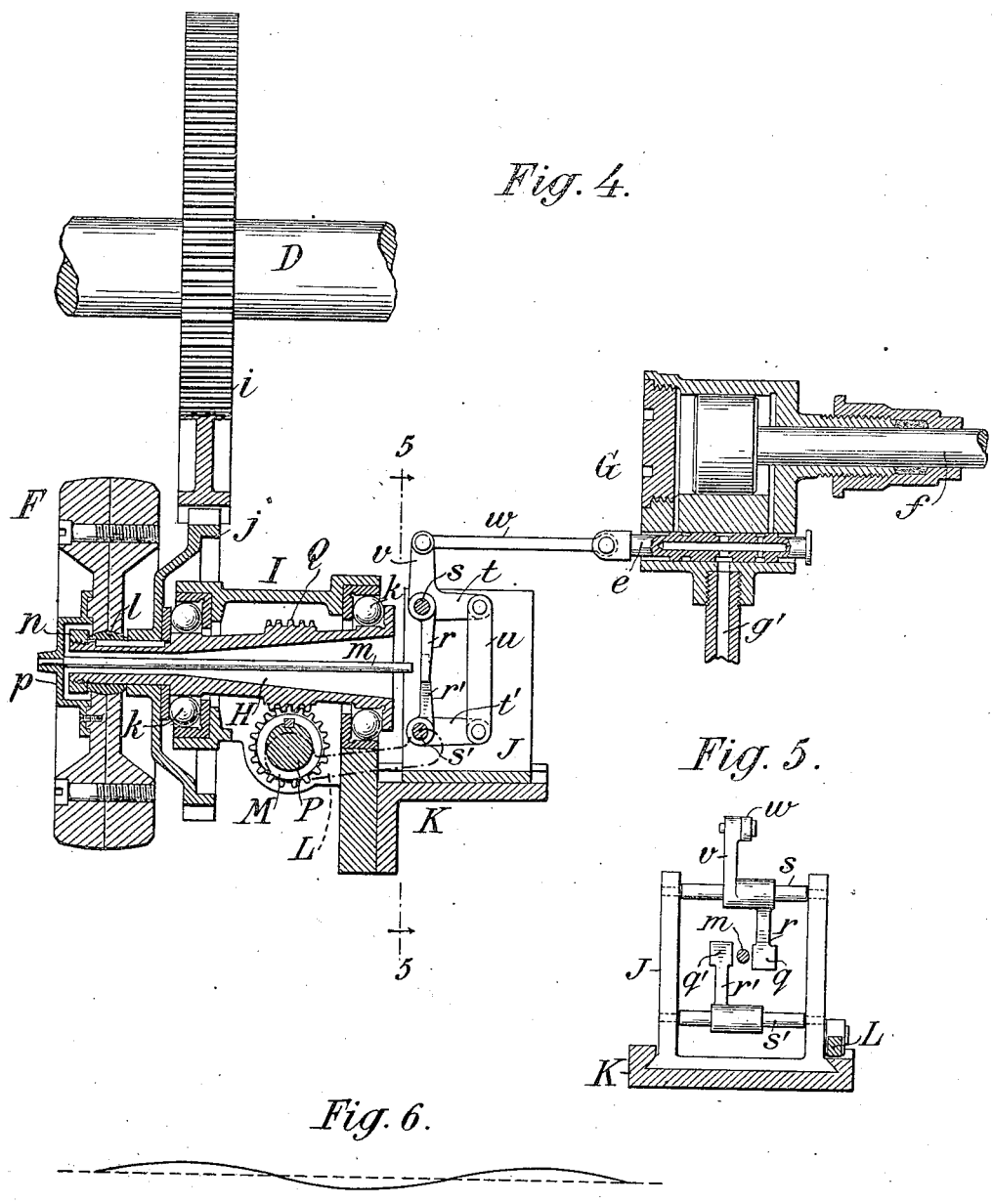

UNITED STATES PATENT OFFICE.

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

STEERING MECHANISM FOR TORPEDOES.

1,179,439.                Specification of Letters Patent.     Patented Apr. 18, 1916.

Application filed August 14, 1915.   Serial No. 45,437.

*To all whom it may concern:*

Be it known that I, FRANK M. LEAVITT, a citizen of the United States of America, residing at Smithtown, in the county of Suffolk and State of New York, have invented certain new and useful Improvements in Steering Mechanism for Torpedoes, of which the following is a specification.

This invention relates to means for steering automobile torpedoes, being designed to overcome an inherent defect in the gyroscope heretofore used for controlling such steering mechanism.

The property of the gyroscope which is utilized in the ordinary gyroscopic steering mechanism, is that of the persistence of the axis of rotation of a revolving mass, that is to say, the tendency of such mass to continue revolving in the same plane so that its axis, normal to such plane, tends to maintain fixity of position and direction. If displaced laterally of such axis, the latter tends to maintain parallelism with its original position. In the practical application of a gyroscope, the rotation of the earth sometimes becomes a disturbing factor. If the gyroscope were set spinning on the earth's equator with its axis parallel to the earth's axis, no disturbance would result because the gyroscope axis would be carried around with the earth, its axis occupying successively parallel positions and pointing apparently fixedly toward Polaris. If spun up with its axis parallel with the equator, the gyroscope axis will execute a tipping or dipping movement corresponding to the earth's rotation, thereby performing an apparent dip of one degree every four minutes of time. If the gyroscope were spun at the earth's pole with its axis horizontal, it would apparently swing laterally at the same rate of movement, making a complete revolution in twenty four hours. As torpedoes are usually launched in the temperate zones or more or less removed from the earth's equator toward the poles, this lateral displacement of the gyroscope axis (if originally pointing north) is reduced practically as the sine of the angle of latitude. So for any location on the earth, and for any initial direction of the gyroscope axis, its relative displacement becomes a resultant of the conditions named. The tilting or dipping movement is negligible because during the short period of travel of the torpedo this movement, occurring in a vertical plane, cannot impair the steering efficacy of the gyroscope. But any swinging movement relatively to the earth's surface in a horizontal plane, proportionally disturbs the steering efficiency, and this movement becomes more pronounced as the location of launching approaches the poles of the earth, being at its extreme a lateral deflection of one degree for each four minutes of time. Formerly, when the run of the torpedo continued for only about five minutes, the disturbance due to this was so slight as to be practically negligible. But with the modern torpedo the run of which may continue for ten minutes or more, and particularly when the course approaches due north or south, the disturbance becomes sufficient to require compensating for, else the torpedo will be steered in a curved path such that it might wholly miss its intended target.

The present invention utilizes a phenomenon which involves some departure from the mere persistence of the plane of rotation of a revolving mass. If a revolving mass, as a shaft, has mounted upon it a rotatable mass, such as a wheel or disk, in such manner that the latter may freely tilt in any direction relatively to the shaft, and in such manner that the shaft has a frictional driving effect upon such mass, the latter will after a little time assume a plane of rotation perpendicular to the axis of the revolving shaft, or in other words, so that such axis is normal to such plane. If now the shaft be deflected so that its axis departs from such normal, the rotating mass will tend to continue revolving in its original plane (or in a plane parallel thereto), but gradually this plane will be diverted and ultimately it will reach a new position of perpendicularity to the axis of the shaft. Upon the original deflection of the shaft axis the relative movement thus occasioned may be availed of to set in motion forces which will bring about an opposite deflection of such axis. This will arrest the tendency of the revolving mass to follow the shaft and assume a new plane perpendicular thereto. It is thus possible to bring about alternating swinging movements of the shaft axis with such frequency and at such nearly equal time intervals, that the departure of the plane of the rotating mass from its original position becomes negligible, so that the mass has for all practical purposes the same persistence of plane that is characteristic of a gyroscope fly-wheel. Inasmuch, however, as the location of its plane of rotation is corrected or reëstablished at each new deflection of the shaft, any tendency to disturbance of this plane due to the rotation of the earth, is corrected at each new oscillation, whereas in a gyroscope which is spun up once for all the disturbance due to the earth's rotation is cumulative. Availing of this phenomenon, the present invention seeks to avoid that cumulative disturbance which occurs in torpedo steering apparatus by reason of the rotation of the earth.

In a torpedo, the steering apparatus acts only upon a certain angular deviation of the torpedo from its intended course, (such deviation amounting practically to a fraction of a degree) the rudder shifting from extreme port to extreme starboard and back, so that the torpedo is steered in a sinuous course the mean of which is the straight or intended course toward its target. The steering mechanism should be so adjusted that the alternate arcs through which the torpedo is steered are of equal tactical radius, so that the torpedo crosses and recrosses its mean or straight course at equal successive time intervals. Such adjustment affords the ideal opportunity for the application of the present invention.

In carrying this invention into practice, a wheel or fly-wheel (hereinafter called a "disk") is mounted in flexible manner upon a shaft within the torpedo, so that it is driven frictionally from the shaft, and so that when once set into rotation in a given plane, presumably a plane normal to said shaft, it may continue rotating in the same plane notwithstanding that the shaft may have been deflected from such normal by reason of a swerving of the torpedo. The relative movement thus occurring between the unchanged plane of rotation of the disk and the deflected axis of the shaft is utilized in one of a variety of ways to control a steering device, which operates to steer the torpedo in such direction as to tend to restore the torpedo to the position it had when the shaft carried by the torpedo occupied its original relation of a normal to the plane of rotation of the disk. In practical operation the steering carries the torpedo to the opposite side so that the shaft swings alternately from one side to the other of such normal. At each such swing of the shaft there is instituted the effort of the revolving disk to readjust its plane to the new plane perpendicular to the shaft axis. This motion however is so slow as to not impair the effectiveness of the steering action due to the relative movement; and yet it is sufficient to impress upon the revolving mass at each swing of the shaft a new position whereby any tendency to deflection due to the earth's rotation is neutralized. The effect is much the same as if at each new steering operation a gyroscope fly-wheel were newly spun up with a new position imparted to it with relation to the then course of the torpedo, whereby the cumulative disturbance due to the continued rotation of the fly-wheel taking direction from its original impetus is avoided.

To make the invention clear, I will first describe it in its simplest form, and will then describe the preferred construction.

Figure 2:
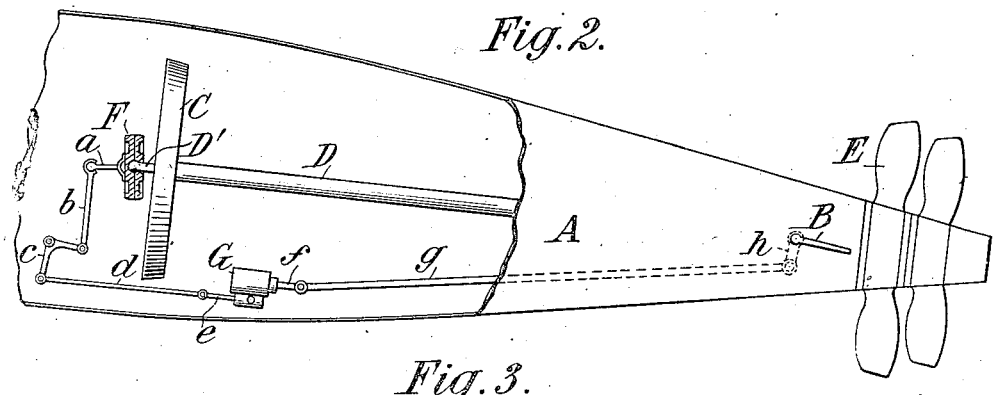
Figure 3:
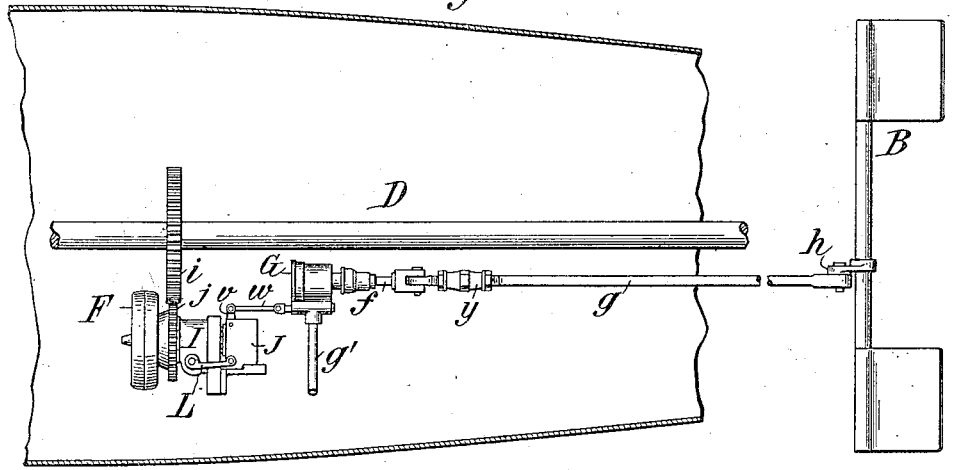

Figures 1 and 2 are sectional plan views of the after portion of a torpedo showing somewhat diagrammatically a simple or rudimentary application of the invention; Fig. 1 showing the parts in the starting or launching position or at some future part of the course where the torpedo is headed in the direction originally aimed; while Fig. 2 shows the torpedo deflected or swerved from such course. Fig. 3 is a vertical section of the torpedo showing in elevation the preferred construction. Fig. 4 shows the preferred construction on a larger scale and mainly in vertical mid-section. Fig. 5 is a vertical transverse section on the plane of the line 5—5 in Fig. 4 and looking aft. Fig. 6 is a diagram, being a plane illustrating the sinuous course steered by the torpedo.

In the drawings, A is the shell or hull of the torpedo, B the steering rudder which steers it in a horizontal plane, C the turbine or other engine driving the propeller shaft D, and E E are the propellers driven from this shaft, the one directly and the other through reversing gearing (not shown) in a well known manner.

F is the rotating mass or wheel, herein called the disk, which is to control the steering.

G is any suitable type of steering device, herein called the steering engine, and which under control of the disk F operates the rudder B.

The disk F is mounted flexibly upon any suitable revolving shaft of the torpedo. In Figs. 1 and 2 it is mounted upon the propeller shaft D by means of a forward extension D' therefrom. The mounting of the disk on this shaft must be sufficiently flexible to permit of the relative deflection of the shaft and disk from their normal perpendicular relation and through a sufficient angle to accomplish the requisite control. The preferable form of flexible connection is a ball-and-socket joint, the shaft being formed with a terminal ball which is socketed in the disk.

Let us assume that at the instant of launching with the torpedo pointed toward its target, the disk F is set in rapid rotation in a plane transverse to the torpedo, that is, perpendicular to the axis of the shafts D D'. This condition is shown in Fig. 1. Let it be assumed that upon striking the water the torpedo is deflected or swerved, as by a lateral current, and occupies for example the position shown in Fig. 2. The swerving of the torpedo carries with it the shaft D which thus is deflected from its original position perpendicular or normal to the plane of rotation of the disk. The disk by reason of its inertia continues to rotate in its original plane of rotation. The divergence thus occasioned is utilized to operate the steering engine and cause it to throw the rudder to such position as to steer the torpedo back toward its original direction, thereby restoring the shaft axis to its original position normal to the plane of rotation of the disk.

For this purpose any suitable mechanical electrical or other intermediary may be availed of whereby the controlling member or element of the steering engine is operated as a result of such deflection. As a simple means of illustrating such control there is shown in Fig. 1 an arm $a$ projecting forward from the disk coincident with its axis of rotation, and terminating in a ball which is engaged by a socket at the end of a link $b$, the opposite end of which connects to one arm of an elbow-lever $c$, the other arm of which connects by a link $d$ to the valve stem $e$ of the steering engine. (This connecting mechanism is shown only by way of illustration, it being understood that although possible of application, the effort to operate the engine valve by a direct thrust from the disk would be inadvisable owing to the reaction due to frictional or other resistance tending to divert the disk from its original plane of rotation). The particular steering engine shown is the ordinary type of servo-motor operated by compressed air which is commonly used in torpedoes, the construction being such that a movement of the valve in a given direction is followed by a movement of the piston or plunger in the same direction, this being communicated through the piston rod $f$ and a connecting rod $g$ to the tiller $h$ of the rudder, in the well known manner. It is understood that the use of this particular type of steering device is unessential to the present invention, and that it may be replaced by any equivalent steering engine or steering mechanism.

The rotation of the disk may be brought about originally by any suitable means, as for example by spinning it up in any of the ways commonly known for use with gyroscopes. As shown, it will be set in rotation automatically upon the starting of the turbine or motor through the medium of the slight friction existing between the ball and socket, a friction sufficient to rotate the disk but insufficient to resist the relative movement which occurs upon the swerving or deflection of the torpedo.

The preferred construction will now be described.

In Figs. 3 and 4 the disk F instead of being on an extension of the propeller shaft D, is mounted on a shaft parallel therewith and which is driven therefrom through gearing $i, j$. This shaft H is made hollow as shown in Fig. 4, so that a pin $m$ (corresponding to the arm $a$ in Fig. 1) may pass through it, occupying normally an axial position within it, as shown in Fig. 4. The shaft H is shown as mounted in ball bearings $k$ $k$ within a frame I which is suitably mounted rigidly within the torpedo. The disk F is mounted by a ball and socket connection upon the end of the shaft H which protrudes beyond its bearings. In the construction shown a ball $l$ is keyed on the end of the shaft adjacent to the hub of the gear wheel $j$ and is held in place by by a nut $n$. The disk F is made in two parts, its inner portion being hollowed out in the segment of the sphere so as to make a smooth working fit with the ball $l$. To connect the pin $m$ to the disk, the latter has fastened to it a cup $p$ to the middle of which the pin $m$ is fastened, and this pin projects thence through the hollow of the shaft H as before stated, its free end extending beyond the larger end of the shaft, as shown.

It will be understood that upon any swerving of the torpedo the consequent deflection of the shaft H will bring its larger end to a position eccentric to the end of the pin $m$, the axis of the latter remaining unchanged by reason of the persistence of plane of the rotating disk. Or otherwise stated, the pin $m$ will appear to swing within the shaft H and assume an eccentric position with relation thereto. Such relative swinging movements are availed of to operate the steering engine.

It is practically of the utmost importance that the operative effort be communicated from the pin $m$ to the valve or controlling element of the steering engine without imposing any lateral resistance to the pin $m$, as the effect of such lateral resistance would be to exert against the disk an effort to change its plane of rotation, and this effort would be more or less effective, and by changing such plane would derange the steering control, being equivalent to a deflection of the axis on which the torpedo was aimed. For this reason it is important to provide means for communicating the deflection of the pin to the valve or steering control member in such manner as shall not tend to disturb the plane of the disk, that is to say, without imposing any lateral thrust against the pin. This function is performed by the mechanism now to be described, which upon analysis will be found to be a modification of that set forth in my Patent No. 795,045 dated July 18, 1905. A mechanism operating on this principle has been commonly used for the gyroscopic control of the steering in the Bliss-Leavitt torpedo.

Referring to Fig. 5, the end of the rod $m$ is shown in its normal or mid position where it stands between two tappets $q$ $q'$. On its horizontal deflection to either side it will come into line with one or other of these tappets. The tappets are mounted on arms $r$ $r'$ pivoted on spindles $s$ $s'$ above and below respectively and having (Fig. 4) rearwardly projecting arms $t$ $t'$ respectively which are connected by a link $u$ so as to communicate the movement of either tappet arm into an opposite movement of the other. The upper tappet has an arm $v$ whereby the movement of either tappet is communicated through a link $w$ to the valve stem $e$ of the steering engine G. This engine is here shown in section, being of a type wherein when the valve is moved in one direction it admits compressed fluid to move the piston in the contrary direction. The engine is operated by compressed air admitted through a tube $g'$. The engine requires no description, being of a well known type.

The tappet mechanism is carried by some reciprocating part whereby the tappets are given a rapid movement of reciprocation in fore and aft direction, so that on the forward movement they move toward the pin $m$ and on the rearward movement they move away from and beyond the pin. The parts are so positioned that upon such forward movement if the pin be deflected to either side it is struck by one of the tappets and that tappet thereby pushed back, which through the link $u$ throws the other tappet forward. The pushing back of one tappet acts through the arm $v$ to pull the valve rod $w$, while the pushing back of the other tappet acts to push through this rod. In either case the movement is communicated to the valve in such direction as to operate the engine and move the steering rudder in such direction as to steer the torpedo back to its original direction and thereby restore the pin $m$ to its mid position.

The reciprocating movements of the tappet mechanism may be imparted in any convenient way as by mounting them in a slide J which is shown as movable in ways in a fixed bracket K; the slide is connected by a link L with a crank M on a transverse shaft P which carries a worm wheel meshing with a worm Q conveniently formed on the hollow shaft H. By means of this tappet mechanism the position of the pin $m$ is utilized to communicate a thrust to the valve of the steering engine, the push being longitudinally of the pin and hence having no tendency to disturb the plane of rotation of the disk.

From the foregoing description it will be apparent that the revolving mass afforded by the disk F being suitably set in rotation as by the friction transmitted through its ball and socket mounting on the shaft, will assume a plane of rotation normal to the axis of the shaft. If by reason of a lateral swerving of the torpedo the axis of the shaft be slightly changed in direction, the disk will not immediately assume a new plane normal to the new axial position of the shaft, but will slowly swing around to such new position. If now the axis of the shaft be diverted in the opposite direction, the disk will slowly follow this motion. If as in the normal steering of a torpedo the shaft be rapidly shifted through a small angle alternately to the right and left and through the same angle in each direction and during the same period of time, then the revolving disk will maintain an average position in its original plane, this plane remaining substantially fixed, although subject to minute correction in its angular position at each new deflection. The relative motion between the disk and shaft is utilized through the mechanism described for actuating the steering engine, thus steering the torpedo in a sinuous line (see Fig. 6) the mean of which is a straight line perpendicular to the mean plane of rotation of the disk.

To accomplish the desired result, it is practically essential that the steering rudders B shall be equally effective in the port and starboard positions, in order that the arcs through which the torpedo is steered (see Fig. 6) shall be of equal tactical radius on opposite sides of the mean direction or average course of the torpedo (see dotted line in Fig. 6), and so that the successive opposite angular deflections of the shaft axis shall follow at equal time intervals. This normally requires the introduction of some means for adjusting the swing of the rudder to either side. Such means is provided by the provision of an adjusting sleeve or union $y$ (Fig. 3) engaging right and left threads on a portion of the connecting rod $g$, so that by turning this collar the rod may be lengthened or shortened and thereby the angular position of the rudder be varied.

The friction existing in the ball and socket mounting of the disk on its shaft, constitutes a factor contributing to the successful operation of the device. This friction affords (in the specific construction shown) the means whereby the disk is rotated to approximately the speed of the shaft. Any other means for rotating the disk may however be provided. The friction is also believed to be the force which causes the disk to seek to follow the deflection of the shaft.

If in any case it should be desirable to substantially eliminate the friction between these parts, some other agency should be provided which will impart to the disk the necessary tendency to slowly readjust itself to a normal with the shaft.

While my invention is applicable in place of the ordinary gyroscopic mechanism for controlling the steering engine, yet I contemplate operating it in association therewith in a manner which will be set forth in a separate application for patent.

It is to be understood that the steering engine shown may be replaced by any other steering engine or steering mechanism, an example of such equivalent steering engines or devices being found in my Patent No. 785,425 granted March 21, 1905. I use the generic term steering mechanism to indicate such steering engine or any equivalent steering means.

I claim as my invention:—

1. In an automobile torpedo, the combination with a rotating shaft thereof of a disk mounted flexibly on said shaft, with a frictional driving engagement, and a steering mechanism having a controlling member connected to be operated by a deflection of the shaft from the normal to the plane of rotation of the disk.

2. In an automobile torpedo, the combination with a rotating shaft thereof having a ball hub fixed thereon, of a disk mounted flexibly on said hub, with a frictional driving engagement, and a steering mechanism having a controlling member connected to be operated by a deflection of the shaft from the normal to the plane of rotation of the disk and adapted to steer the torpedo in such direction as to restore the shaft to such normal.

3. In an automobile torpedo, the combination with a rotating shaft thereof of a disk mounted flexibly on said shaft, said disk having a pin projecting axially from it, a steering mechanism, and means between the controlling member of such mechanism and said pin whereby on a deflection of the shaft from the normal to the plane of rotation of the disk, the relative movement of said pin operates such controlling member in the appropriate direction for steering the torpedo back to its original direction.

4. In an automobile torpedo, the combination with a rotating shaft thereof of a disk mounted flexibly on said shaft, said disk having a pin projecting axially from it, a steering mechanism, and means between the controlling member of such mechanism and said pin comprising reciprocating tappets moving axially toward and from the pin, so that on the deflection of the latter into the path of either tappet the latter strikes the pin and is displaced thereby, and means for communicating such displacement of the respective tappets to such controlling member.

5. In an automobile torpedo, the combination with a rotating shaft thereof of a disk mounted flexibly on said shaft, the respective parts having a ball and socket connection with a frictional driving engagement whereby the disk tends to revolve in a plane normal to the shaft, and a steering mechanism having a controlling member connected to be operated by a deflection of the shaft from such normal.

In witness whereof, I have hereunto signed my name in the presence of two subscribing witnesses.

FRANK M. LEAVITT.

Witnesses:
PETER KRUSE,
CHAS. J. ELLSWORTH.